United States Patent [19]

Roberts et al.

[11] 4,325,854

[45] Apr. 20, 1982

[54] SOLVENT SOLUTIONS OF CHEMICALLY MODIFIED ASPHALTS

[75] Inventors: Michael G. Roberts; Joseph F. Tanner, both of Newark, Ohio

[73] Assignee: Owens-Corning Fiberglas Corporation, Toledo, Ohio

[21] Appl. No.: 249,593

[22] Filed: Apr. 1, 1981

[51] Int. Cl.³ .............................................. C08L 95/00
[52] U.S. Cl. .................................. 524/476; 106/278; 427/388.1; 427/388.5; 428/462; 524/484; 524/534
[58] Field of Search ................. 260/28.5 AS, 28.5 A, 260/4 AR, 5, 28.5 R; 106/278; 427/388.1, 388.5

[56] References Cited

U.S. PATENT DOCUMENTS

| | | | |
|---|---|---|---|
| 4,175,978 | 11/1979 | Marzocchi et al. | 106/281 R |
| 4,248,936 | 2/1981 | Marzocchi et al. | 428/391 |
| 4,273,685 | 6/1981 | Marzocchi et al. | 260/28.5 R |

*Primary Examiner*—Theodore Pertilla
*Attorney, Agent, or Firm*—Ronald C. Hudgens; Robert F. Rywalski

[57] ABSTRACT

Homogeneous, substantially single phase, stable solutions of the reaction product of asphalt, a vinyl aromatic monomer, and a rubbery polymer, in a toluene based solvent, are provided. These solutions may be sprayed onto metal surfaces to provide corrosion resistant coatings thereon and also coatings which have a sound dampening quality.

9 Claims, No Drawings

SOLVENT SOLUTIONS OF CHEMICALLY MODIFIED ASPHALTS

TECHNICAL FIELD

The present invention relates to chemically modified asphalt compositions and more particularly, it relates to solvent solutions thereof. Even yet more particularly, the present invention relates to coating metal substrates with such solvent solutions to provide a corrosion resistant and/or sound dampening coating thereof.

BACKGROUND AND SUMMARY

Chemically modified asphalt compositions which are the reaction product of asphalt, a polymerizable vinyl aromatic monomer and a rubbery polymer are well known in the art. In this respect, reference may be had to U.S. Ser. No. 045,047, now U.S. Pat. No. 4,273,685 which is hereby incorporated by reference. These compositions can be used to coat glass and are of great utility in highway maintenance. Typically, such chemically modified asphalt compositions are prepared by reacting, with asphalt, a vinyl aromatic monomer in an amount of about 0.5 to about 35%, based on the weight of asphalt, and a rubbery polymer in an amount of about 0.5 to about 30% by weight, based upon the weight of the asphalt. The reaction is done at an elevated temperature for a sufficient period of time to substantially complete the reaction. Preferably, the temperatures employed will be on the order of about 340° F. to about 355° F. (171° C. to about 179° C.), with a typical time being on the order of about 24 hours. Preferred asphalt materials are the paving grade asphalt materials such as, for example, AC-20, and the preferred rubbery polymer is a copolymer of styrene and butadiene, such as, for example, that available from Phillips Petroleum under their designation Solprene 1205C material.

In accordance with the present invention, homogeneous, substantially single phase, stable organic solvent solutions of such reaction products are provided. Such solutions may be conveniently applied using conventional technology, such as, for example, conventional spray application technology, onto metal substrates to provide a corrosion resistant coating thereon and/or a sound dampening coating thereon.

DESCRIPTION

The preferred chemically modified asphalt material contemplated for use herein is the reaction product of about 77.5% by weight of asphalt (AC-20), about 10% by weight of styrene and about 12.5% by weight of Solprene 1205C material as the rubbery polymer. This chemically modified asphalt is formed by reacting the above ingredients at a temperature between about 340° F. to 355° F. (171° C. to 179° C.) for a period of time of about 24 hours. Generally representative, however, of suitable vinyl aromatic monomers are those of the formula $CH_2=CH-R$, wherein R is an aromatic group, such as a phenyl group, a substituted phenyl group wherein the substituent is any one of an amino group, a cyano group, a halogen group, a $C_1-C_3$ alkoxy group, a $C_1-C_3$ alkyl group, a hydroxy group, a nitro group, etc. R can also be a heterocyclic aromatic group such as a pyridyl group, a quinolyl group and the like. In general, R is an aromatic group containing 6-12 carbon atoms. As the rubbery polymer, use can be made of a number of elastomeric materials well known to those skilled in the art, including the natural rubbers as well as synthetic rubbers. Suitably, synthetic rubbers can be homopolymers of a conjugated diene, e.g., butadiene, isoprene, chloroprene, etc., as well as various polymers which are substituted with a functional group containing a labile hydrogen atom. For example, various hydroxy, amino and like substituted homopolymers of conjugated dienes may likewise be used in the practice of this invention. Preferably, however, the rubbery polymers are elastomeric materials formed by copolymerization of one or more of the conjugated dienes with one or more ethylenic monomers such as styrene, as well as hydroxy, amino and mercapto substituted derivatives thereof, acrylonitrile, methacrylonitrile, acrylic acid, methacrylic acid, etc. Thus, included are, as indicated above, the butadiene styrene rubbers, butadiene acrylonitrile rubbers, etc. Hydroxy terminated copolymers are likewise useful in the practice of this invention.

When reference is made herein to a solvent solution of chemically modified asphalts which are the reaction products of the materials of the type indicated above, no fine technical distinction is intended between true solutions and dispersions. Suffice it to say that the solutions, as contemplated herein, are homogeneous, stable, and they are substantially a single phase. In passing it should be mentioned that all solvents are not equivalent for purposes of the present invention. For example, Stoddard solvent and mineral spirits are unsuitable organic solvents because they create a gellation problem with the above type indicated chemically modified asphalts. Additionally, heptane, hexane, and xylene are, likewise, unsuitable because they have a pronounced propensity to phase separate after standing, for example, upon standing for a day or two. The solvents contemplated for use herein which will produce homogeneous, stable, substantially single phase solutions are: (a) toluene; (b) a mixture consisting essentially of toluene and xylene having a minimum of about 25% (by weight) toluene and a maximum of about 75% (by weight) xylene and, more preferably, about 40-60% toluene and 60-40% of xylene; (c) a mixture consisting essentially of toluene and Stoddard solvent having a minimum of about 40% toluene, preferably 40-60% toluene, and a maximum of about 60% Stoddard solvent, preferably 40-60% by weight; (d) a mixture consisting essentially of toluene, xylene and either heptane or hexane, or a mixture of hexane and heptane, the toluene being present in a minimum amount of about 25% by weight, preferably 25-60% by weight, xylene being present in a maximum amount of about 55% by weight, preferably 10 to about 55% by weight, and a maximum of about 20% by weight, preferably about 5-20% by weight of heptane or hexane, or a mixture of heptane and hexane; (e) a mixture consisting essentially of toluene, Stoddard solvent and heptane or hexane, or a mixture of heptane or hexane, with the maximum amount of heptane or hexane, or heptane and hexane, being about 25% by weight, preferably about 5-25% by weight, the minimum amount of toluene being about 40% by weight, preferably about 40-75% by weight, and the maximum amount of Stoddard solvent being about 35% by weight, preferably about 10 to about 35% by weight.

Suitably, the solutions will be prepared by employing a weight ratio of the chemically modified asphalt to solvent in the range of about 4:1 to about 4:6, desirably in the ratio of about 7:3 to about 4:6 and most desirably in a ratio of about 6:4 to about 1:1. The solutions are simply prepared by combining the reaction product of asphalt, a polymerizable vinyl aromatic monomer and a rubbery polymer and the above solvents, with agitation being applied for a sufficient period of time to form a homogeneous solution. This may be done at room temperature, or above, and it may likewise be done at atmospheric pressure or at an elevated pressure. The preferred method will be to heat the chemically modified asphalt, for example to a temperature in excess of 300° F. (149° C.), commonly 350° to 400° F. (177° to 204° C.) and to add this molten material to a vessel which is equipped with a reflux condenser. This temperature will generally be maintained, with agitation, until approximately 20% of the solvent is added and then heating may be discontinued, as the solution will then be sufficiently fluid to allow for convenient agitation without the necessity of heat. Preferably, the vessel will be maintained at an elevated pressure, for example, about 25 to about 30 psig. Such resulting solutions are homogeneous and stable in that they, upon standing for prolonged periods of time, will remain as substantially single phase solutions.

The above-indicated solutions may be applied by any conventional spraying technique onto metal substrates to provide a corrosion resistant coating thereon and/or a coating which has sound dampening characteristics. Thus, for example, the above solutions are outstandingly adapted for the rustproofing and/or undercoating of automobiles. They may likewise be employed to coat machines for sound dampening purposes. Any of a wide and numerous variety of metal substrates may be coated with these solutions so as to provide, after solvent evaporation, a coating thereon. Typically, the resultant coatings will have a thickness of about 3 mils to about 60 mils. Exemplary of numerous metals which may be coated in this manner include iron, aluminum, nickel, chrome, copper, lead and the like, and especially fine results will be found with application to iron base alloys, for example, steel and non-ferrous based metal alloys, such as, for example, aluminum based alloys, nickel based alloys, chrome based alloys, copper based alloys, and lead based alloys.

As will be apparent from the foregoing, by employing the solvents indicated, problems and difficulties which are encountered with other solvents, for example, gellation problems and phase separation problems, will now be obviated. The significance of this will be readily apparent to those skilled in the art in that these solvent solutions may be allowed to stand for prolonged periods of time without fear of gelling or phase separation and, because of their homogeneous nature, can be quite conveniently applied to the various metallic substrates.

Having described the present invention, it will, of course, be readily apparent that modification is possible which pursuant to the Patent Statutes and Laws do not depart from the spirit and scope thereof.

We claim:

1. A homogeneous, stable solution of the reaction product of asphalt, a vinyl aromatic monomer, and a rubbery polymer in an organic solvent, said solvent being selected from the group consisting of (a) toluene, (b) a mixture of toluene and xylene having a minimum of about 25% by weight toluene and a maximum of about 75% by weight xylene (c) a mixture of toluene and Stoddard solvent having a minimum of about 40% toluene and a maximum of about 60% Stoddard solvent, (d) a mixture of toluene, xylene and at least a compound selected from the group consisting of heptane and hexane said mixture having a minimum amount of 25% toluene, a maximum of about 55% xylene and a maximum of about 20% of heptane or hexane or a mixture thereof, (e) a mixture of toluene, Stoddard solvent and heptane or hexane, or a mixture of heptane or hexane, the maximum amount of heptane or hexane, or a mixture of heptane or hexane, being about 25%, the minimum amount of toluene being about 40% and the maximum amount of Stoddard solvent being about 35%.

2. The solution of claim 1 wherein said solvent is toluene.

3. The solution of claim 1 wherein said solvent is a mixture of toluene and xylene, with the toluene being present in an amount of about 40-60% and said xylene being present in an amount of about 40-60%.

4. The solution of claim 1 wherein said solvent is a mixture of toluene and Stoddard solvent, with said Stoddard solvent being present in an amount of about 40-60% and toluene being present in an amount of about 40-60%.

5. The solution of claim 1 wherein said solvent is a mixture of toluene, xylene and heptane or hexane, or a mixture of heptane and hexane, with the toluene being present in an amount of about 25-60%, xylene in an amount of about 10 to about 55%, and said hexane or heptane, or mixtures of heptane and hexane, being present in an amount of about 5 to about 20%.

6. The solution of claim 1 wherein said solvent is a mixture of toluene, Stoddard solvent and heptane or hexane, or a mixture of heptane and hexane, with the toluene being present in an amount of about 40-75%, Stoddard solvent in an amount of 10-35%, and said heptane or hexane, or a mixture of heptane and hexane, being present in an amount of about 5-25%.

7. The method which comprises applying the solvent solution of any one of claims 1-6 onto a metal substrate and evaporator the solvent so as to leave a residual coating of said reaction product thereon.

8. A method which comprises combining the reaction product of asphalt, a polymerizable vinyl aromatic monomer and a rubbery polymer with a solvent selected from the group consisting of (a) toluene, (b) a mixture of toluene and xylene having a minimum of about 25% by weight toluene and a maximum of about 75% by weight xylene, (c) a mixture of toluene and Stoddard solvent having a minimum of about 40% toluene and a maximum of about 60% Stoddard solvent, (d) a mixture of toluene, xylene and at least compound selected from the group consisting of heptane and hexane, said mixture having a minimum amount 25% toluene, a maximum of about 55% xylene and a maximum of about 20% of heptane or hexane or a mixture thereof, (e) a mixture of toluene, Stoddard solvent and heptane or hexane, or a mixture of heptane or hexane, the maximum amount of heptane or hexane, or a mixture of heptane or hexane, being about 25%, the minimum amount of toluene being about 40% and the maximum amount of Stoddard solvent being about 35%.

9. The solvent solution of any one of claims 1-6 wherein said polymerizable vinyl aromatic monomer is styrene and said rubber is a copolymer of styrene and butadiene.

* * * * *